US010329817B2

(12) United States Patent
Knutson

(10) Patent No.: US 10,329,817 B2
(45) Date of Patent: Jun. 25, 2019

(54) INSULATED DOOR PANELS

(71) Applicant: Rite-Hite Holding Corporation, Milwaukee, WI (US)

(72) Inventor: Perry W. Knutson, Lancaster, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 150 days.

(21) Appl. No.: 15/199,344

(22) Filed: Jun. 30, 2016

(65) Prior Publication Data

US 2016/0312508 A1 Oct. 27, 2016

Related U.S. Application Data

(62) Division of application No. 13/532,379, filed on Jun. 25, 2012, now Pat. No. 9,410,363.

(51) Int. Cl.
*E06B 5/00* (2006.01)
*B32B 3/00* (2006.01)
(Continued)

(52) U.S. Cl.
CPC .......... *E05D 15/242* (2013.01); *E05D 15/18* (2013.01); *E05F 15/676* (2015.01); *E06B 3/44* (2013.01);
(Continued)

(58) Field of Classification Search
CPC .. F25D 23/021; F25D 13/00; F25D 2201/126; E06B 2009/17069; E06B 9/13;
(Continued)

(56) References Cited

U.S. PATENT DOCUMENTS 2,342,839 A 2/1944 Byers
2,934,465 A 4/1960 Warp
(Continued)

FOREIGN PATENT DOCUMENTS

DE 202005012486 10/2005
EP 1559449 8/2005
(Continued)

OTHER PUBLICATIONS

European Patent Office, "Communication pursuant to Article 94(3) EPC," issued in connection with European Patent Application No. 13 734 278.8, dated Aug. 4, 2017, 5 pages.
(Continued)

*Primary Examiner* — Daniel P Cahn
(74) *Attorney, Agent, or Firm* — Hanley, Flight & Zimmerman, LLC

(57) ABSTRACT

Example insulated pliable door panels or curtains include various internal vapor barriers. The vapor barriers have a relatively high water vapor transmission rate that inhibits water vapor from permeating through the door panel. With such vapor barriers, outer sheets of the door panel can be made of polyurethane or other tough materials that might have an inadequate water vapor transmission rate. In some examples, the vapor barrier encircles or encloses a thermally insulating pad. In some examples, the door panel includes a sleeve or pocket that holds the vapor barrier in place. Some examples include means for draining water that might condense within the door panel.

19 Claims, 10 Drawing Sheets

(51) Int. Cl.

| | |
|---|---|
| ***E05D 15/24*** | (2006.01) |
| ***E06B 3/80*** | (2006.01) |
| ***E06B 9/13*** | (2006.01) |
| ***F25D 23/02*** | (2006.01) |
| ***E06B 3/44*** | (2006.01) |
| ***E05F 15/676*** | (2015.01) |
| ***E05D 15/18*** | (2006.01) |
| ***F25D 13/00*** | (2006.01) |
| *E06B 3/70* | (2006.01) |
| *E06B 9/17* | (2006.01) |

(52) U.S. Cl.
CPC .................. *E06B 3/80* (2013.01); *E06B 9/13* (2013.01); *F25D 13/00* (2013.01); *F25D 23/021* (2013.01); *E06B 2003/7051* (2013.01); *E06B 2009/17069* (2013.01); *F25D 2201/126* (2013.01)

(58) Field of Classification Search
CPC ... E06B 9/263; E06B 3/80; E06B 3/44; E06B 2003/7051; E05D 15/242; E05D 15/18; E05F 15/676
USPC ..... 52/63, 222, 406.2, 406.3, 784.1, 784.15; 160/330, 40, 41, 230, 232, 236
See application file for complete search history.

(56) References Cited

U.S. PATENT DOCUMENTS

| | | | | |
|---|---|---|---|---|
| 4,070,839 | A | 1/1978 | Clem | |
| 4,294,875 | A | 10/1981 | Schramm | |
| 4,445,958 | A | 5/1984 | Jaksha | |
| 4,630,664 | A | 12/1986 | Magro | |
| 5,204,172 | A | 4/1993 | Gidley | |
| 5,472,760 | A * | 12/1995 | Norvell | B32B 5/18 428/71 |
| 5,709,053 | A | 1/1998 | Kuroda | |
| 5,915,445 | A | 6/1999 | Rauenbusch | |
| 6,199,337 | B1 | 3/2001 | Colson et al. | |
| 6,360,487 | B1 * | 3/2002 | Kern | E06B 3/4636 160/197 |
| 6,942,001 | B1 | 9/2005 | Crider et al. | |
| 7,984,591 | B2 | 7/2011 | Cashin et al. | |
| 8,839,842 | B2 * | 9/2014 | Ashelin | E06B 9/13 160/330 |
| 8,991,467 | B2 * | 3/2015 | Ashelin | A47H 21/00 160/113 |
| 9,551,181 | B2 * | 1/2017 | Withrow | E06B 7/16 |
| 2001/0005964 | A1 | 7/2001 | Colson et al. | |
| 2004/0079494 | A1 | 4/2004 | Snyder | |
| 2008/0110580 | A1 | 5/2008 | Hoerner et al. | |
| 2008/0264582 | A1 | 10/2008 | Coenraets | |
| 2009/0140097 | A1 * | 6/2009 | Collier | B32B 5/18 244/121 |
| 2010/0095634 | A1 | 4/2010 | Uto | |
| 2010/0132894 | A1 | 6/2010 | Knutson et al. | |
| 2011/0011003 | A1 | 1/2011 | Vogel et al. | |
| 2011/0041411 | A1 | 2/2011 | Aragon | |
| 2011/0119811 | A1 | 5/2011 | Rock et al. | |
| 2012/0018102 | A1 * | 1/2012 | Ungs | E06B 9/13 160/113 |
| 2012/0043031 | A1 | 2/2012 | Leighton | |
| 2012/0141719 | A1 | 6/2012 | Payne et al. | |
| 2012/0238169 | A1 | 9/2012 | Mason et al. | |
| 2013/0098567 | A1 | 4/2013 | Ashelin et al. | |
| 2013/0340953 | A1 | 12/2013 | Knutson | |
| 2016/0108667 | A1 * | 4/2016 | Fischer | E06B 9/13 160/133 |

FOREIGN PATENT DOCUMENTS

| | | |
|---|---|---|
| WO | 9009281 | 8/1990 |
| WO | 2012015564 | 2/2012 |
| WO | 2014004390 | 1/2014 |

OTHER PUBLICATIONS

International Bureau, "International Preliminary Report on Patentability", issued in connection with International patent application No. PCT/US2013/047365, dated Jan. 8, 2015, 10 pages.
Patent Cooperation Treaty, "International Search Report," issued in connection with International application No. PCT/US2013/047365, dated Oct. 30, 2013, 6 pages.
Patent Cooperation Treaty, "Written Opinion," issued in connection with International application No. PCT/US2013/047365, dated Oct. 30, 2013, 8 pages.
United States Patent and Trademark Office, "Non-Final Office Action," issued in connection with U.S. Appl. No. 13/532,379, dated Mar. 14, 2014, 27 pages.
United States Patent and Trademark Office, "Final Office Action," issued in connection with U.S. Appl. No. 13/532,379, dated Jul. 18, 2014, 14 pages.
United States Patent and Trademark Office, "Non-Final Office Action," issued in connection with U.S. Appl. No. 13/532,379, dated Feb. 5, 2015, 25 pages.
United States Patent and Trademark Office, "Final Office Action," issued in connection with U.S. Appl. No. 13/532,379, dated Sep. 23, 2015, 20 pages.
United States Patent and Trademark Office, "Advisory Action," issued in connection with U.S. Appl. No. 13/532,379, dated Dec. 30, 2015, 5 pages.
United States Patent and Trademark Office, "Notice of Allowance and Fee(s) Due," issued in connection with U.S. Appl. No. 13/532,379, dated Apr. 27, 2016, 28 pages.
European Patent Office, "Intention to Grant," issued in connection with European Patent Application No. 13734278.8, dated May 24, 2018, 31 pages.
European Patent Office, "European Search Report," issued in connection with European Application No. 18199668.7, dated Feb. 26, 2019, 9 pages.
European Patent Office, "Communication Pursuant to Rule 69 EPC," issued in connection with European Application No. 18199668.7, dated Apr. 1, 2019, 2 pages.

* cited by examiner

INSULATED DOOR PANELS

RELATED APPLICATION

This patent arises from a divisional of U.S. application Ser. No. 13/532,379, which was filed on Jun. 25, 2012 and is hereby incorporated herein by reference in its entirety.

FIELD OF THE DISCLOSURE

This patent generally relates to insulated doors and more specifically to doors that comprise a flexible panel such as an insulated curtain.

BACKGROUND

Cold storage rooms are refrigerated areas in a building that are commonly used for storing perishable foods. Cold storage rooms are typically large enough for forklifts and other material handling equipment to enter. Access to the room is often through a power actuated insulated door that separates the room from the rest of the building. To minimize thermal losses when someone enters or leaves the room, the door preferably opens and closes as quickly as possible.

Vertically operating roll-up doors and similar doors with flexible curtains are perhaps some of the fastest operating doors available. When such a door opens, its curtain usually bends upon traveling from its closed position in front of the doorway to its open position on an overhead storage track or take-up roller.

Such bending is not a problem if the curtain is relatively thin. However, an insulated curtain may not bend as well due to the required thickness of the insulation. When a take-up roller or curved track bends a thick curtain, relative translation may occur between opposite faces of the curtain. Designing a thick, insulated curtain that can accommodate such translation can be challenging.

DETAILED DESCRIPTION

Figure 1:
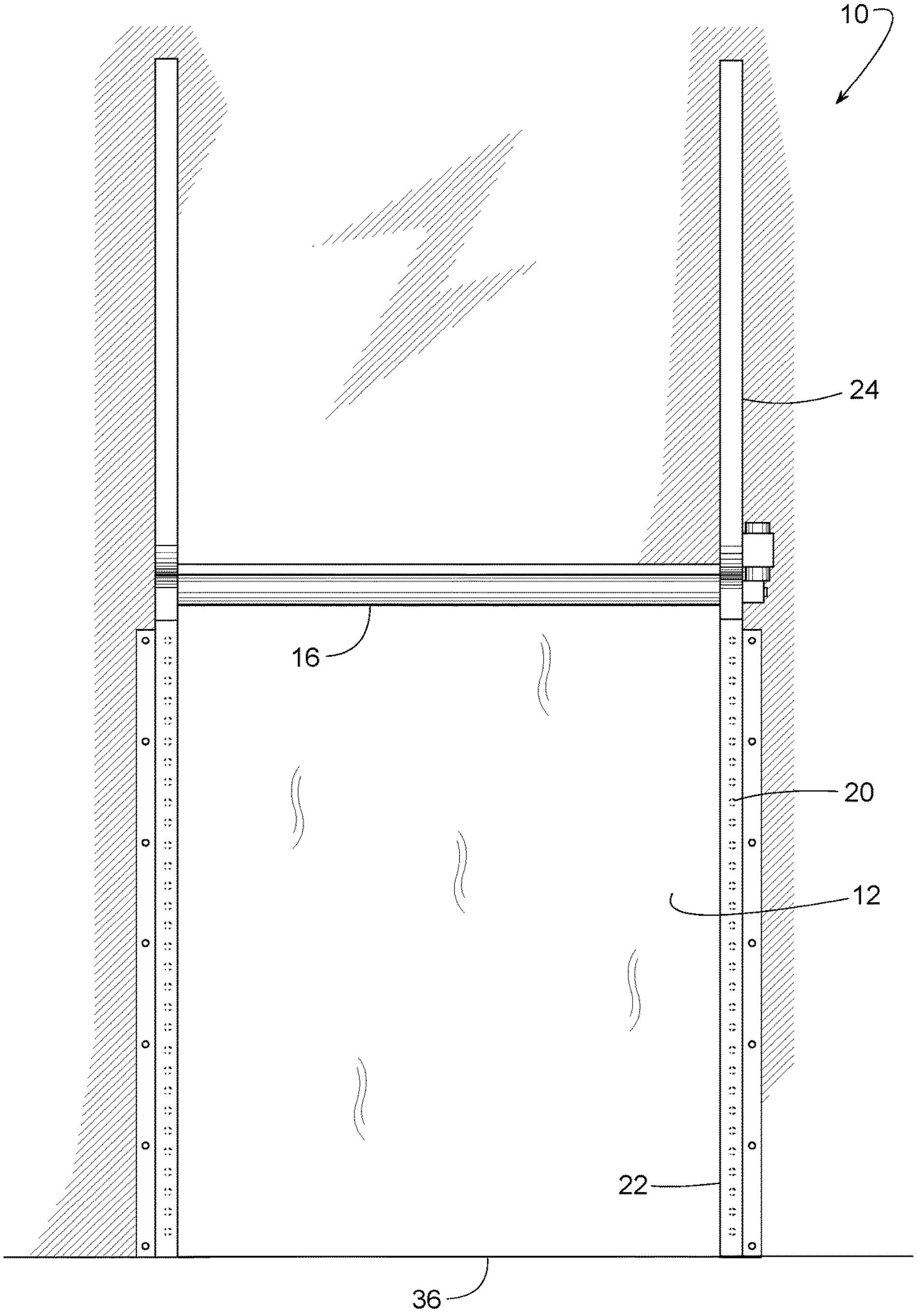
FIG. 1 is a front view showing an example door in a closed position.
Figure 2:
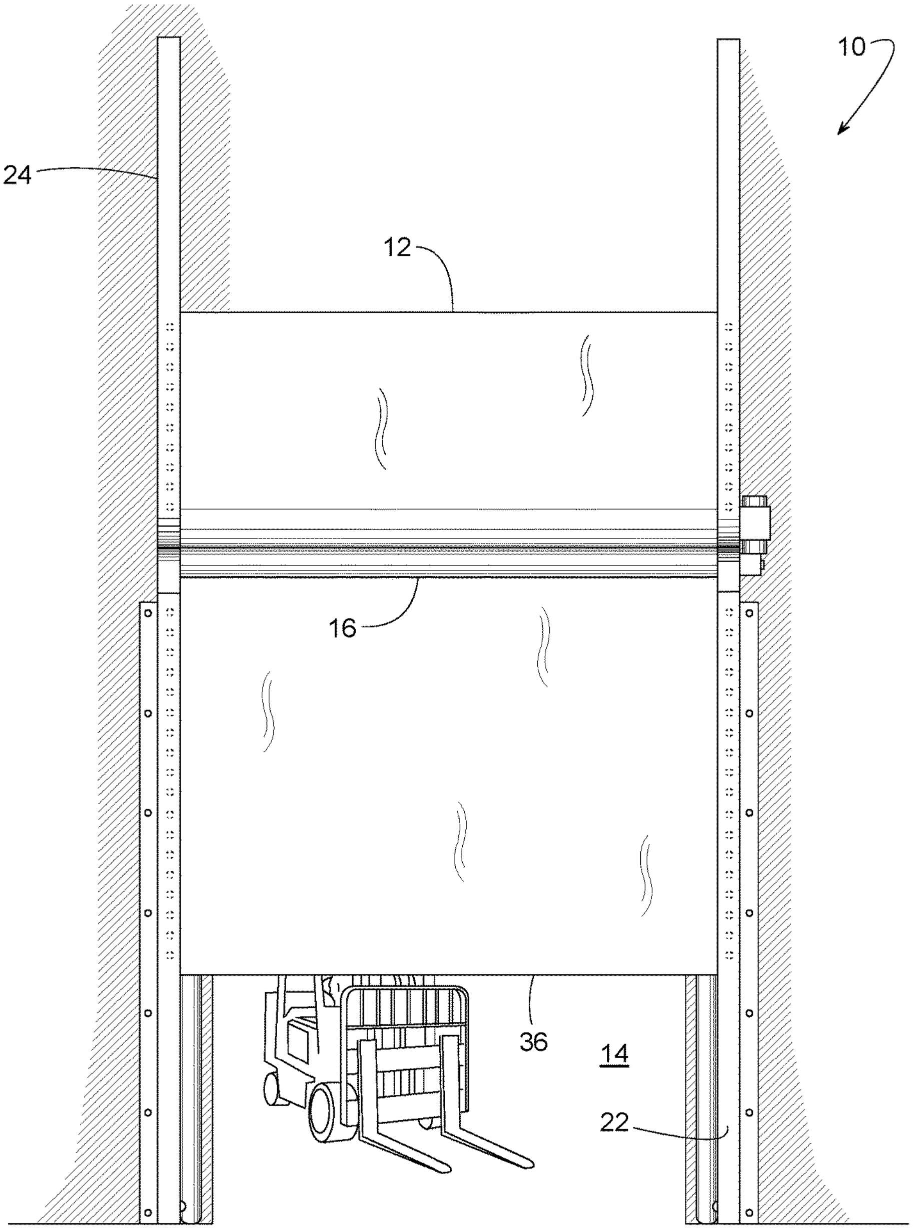
FIG. 2 is a front view similar to FIG. 1 but showing the example door partially open.
Figure 3:
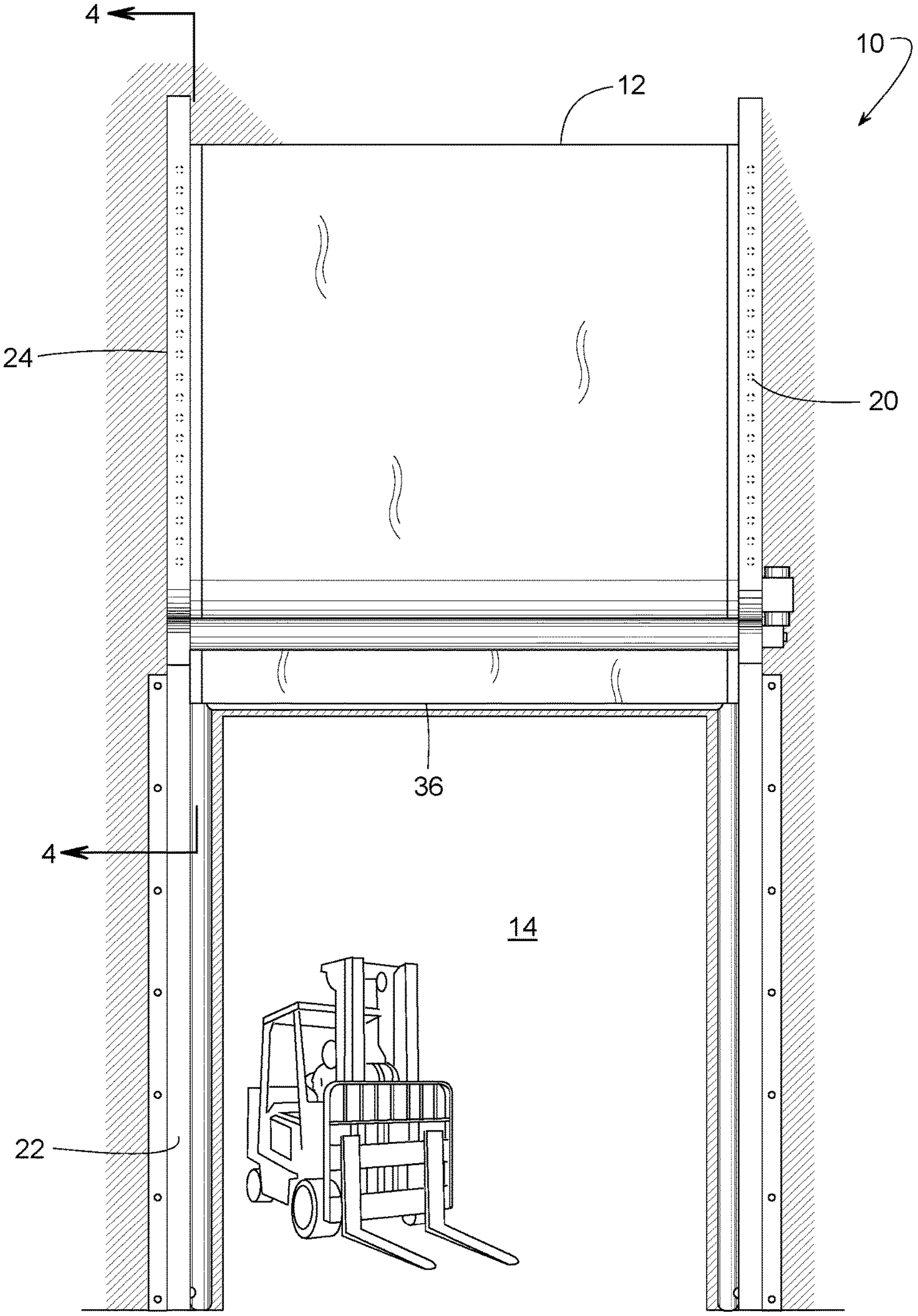
FIG. 3 is a front view similar to FIGS. 1 and 2 but showing the example door in an open position.
Figure 4:
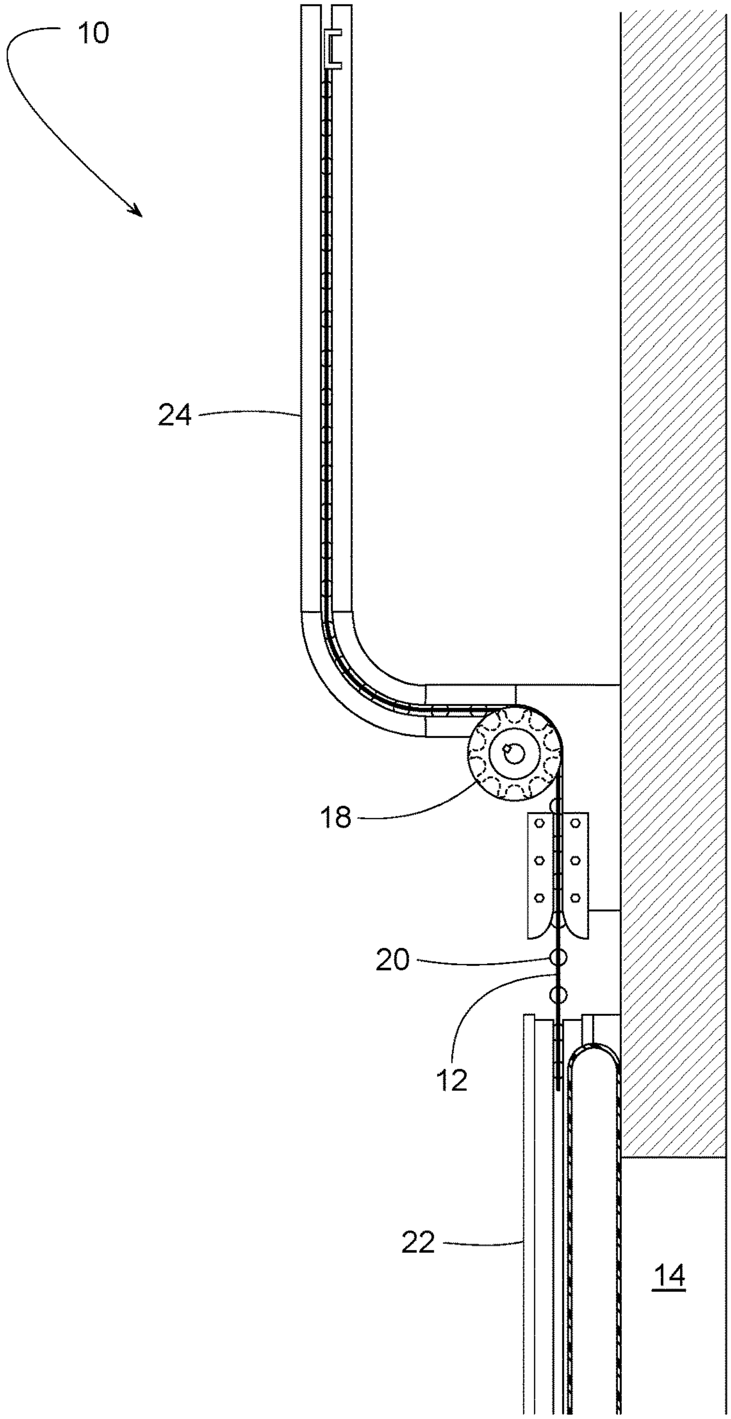
FIG. 4 is a cross-sectional view taken along line 4-4 of FIG. 3.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

FIGS. 1-4 illustrate an example of a vertically operating door 10 that includes a flexible, insulated door panel 12. Door 10 is shown closed in FIG. 1, partially open in FIG. 2, and fully open in FIGS. 3 and 4. In the illustrated example, as door 10 opens and closes relative to a doorway 14, door panel 12 bends over a mandrel 16. Mandrel 16, in some examples, is a fixed bar or a roller extending across the width of doorway 14. Although door panel 12 is shown having a certain double-bend, stored configuration, other stored configurations, such as coiled, wound on a roll tube, single-bend horizontal, serpentine, vertically planar, etc., are all well within the scope of this disclosure.

Although door 10 is useful in unlimited applications, door 10 is particularly suited for providing access to refrigerated cold storage rooms or for separating rooms or areas that are at different temperatures, such as, for example, the interior and exterior of a building at a truck loading dock. In such temperature differential installations, one side of door panel 12 is often colder than the other side, which can subject door panel 12 to an adverse water vapor pressure gradient. While FIGS. 1-9 disclose general features of example door panel 12, FIGS. 10 and 11 disclose more detailed features specifically intended to address the problems associated with the water vapor pressure gradient.

To operate door 10, in some examples, a powered drive sprocket 18 (FIG. 4) engages a cogged strip 20 at each lateral edge of door panel 12 to move door panel 12 between a lower guide track 22, where door panel 12 is blocking doorway 14, and an upper track 24 where door panel 12 is clear of the doorway 14. It should be noted, however, that door panel 12 can be applied to various other types of doors that operate with different drive or storage configurations.

Figure 5:
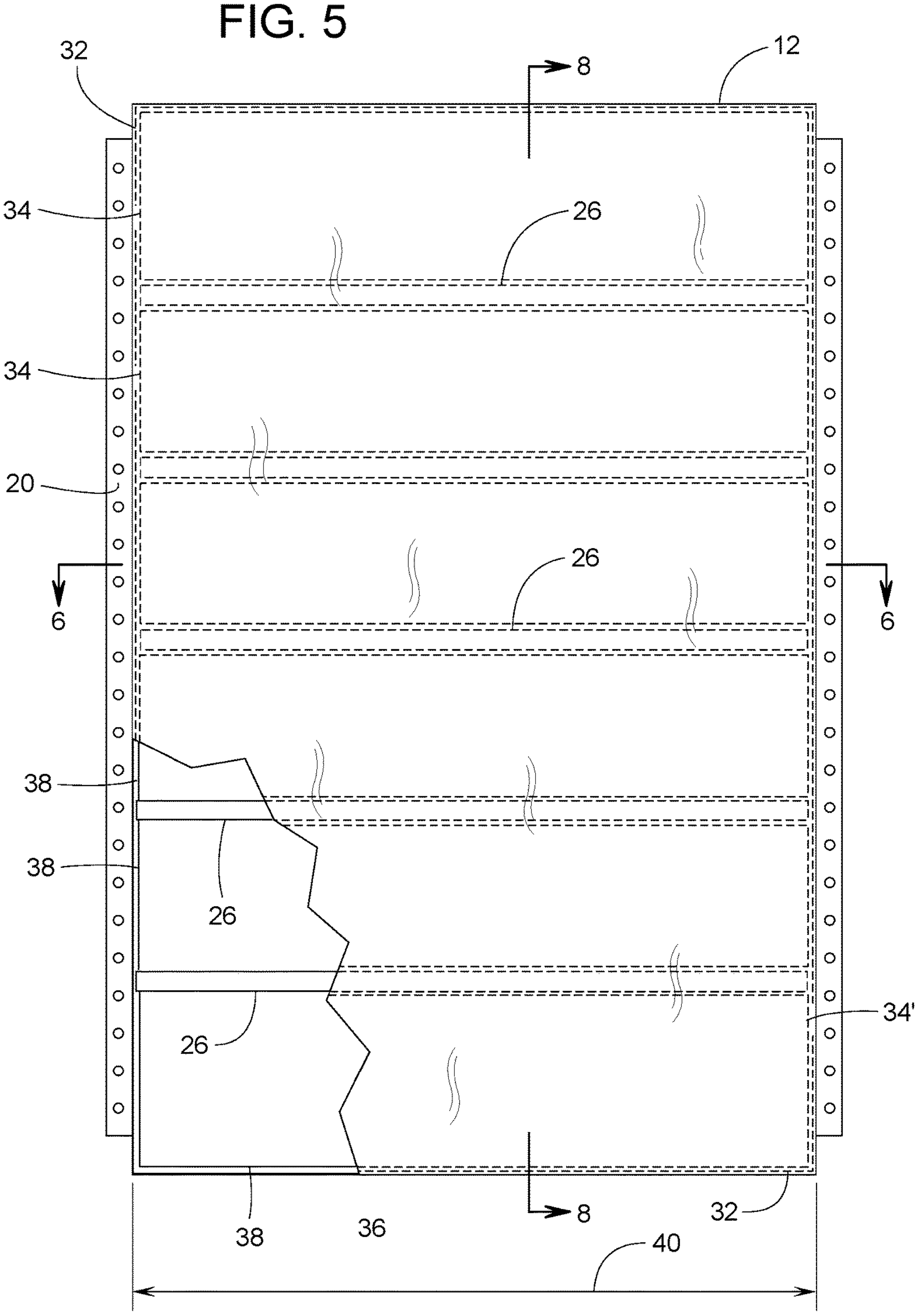
FIG. 5 is a front view of the example door panel of FIGS. 1-3 with a lower-left section of the panel's outer sheet cutaway.
Figure 6:
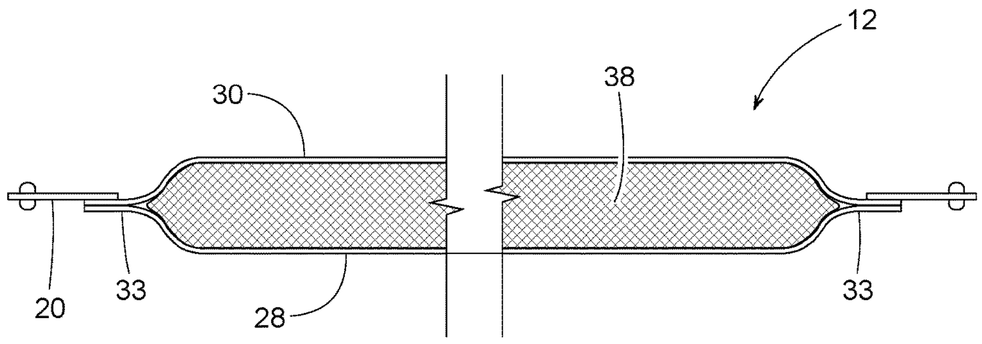
FIG. 6 is a cross-sectional view taken along line 6-6 of FIG. 5.
Figure 7:
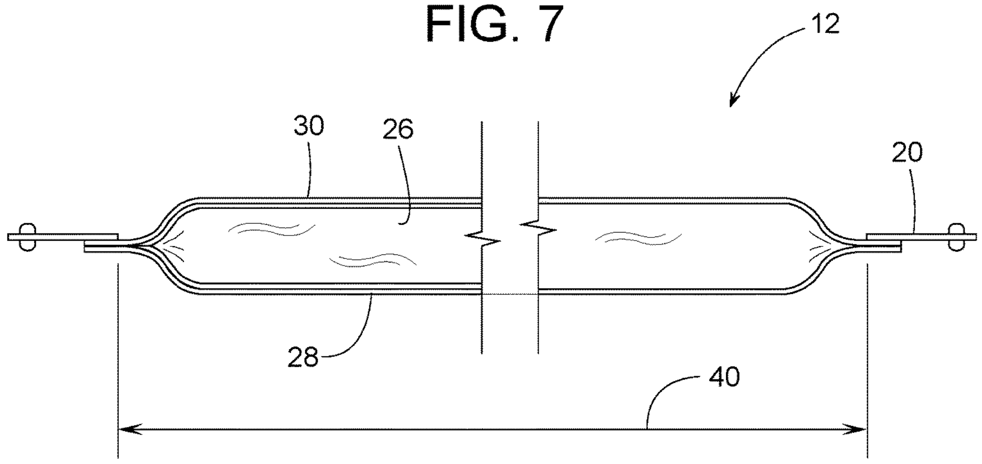
FIG. 7 is a cross-sectional view similar to FIG. 6 but with the insulation omitted to more clearly show one of the example baffles.
Figure 8:
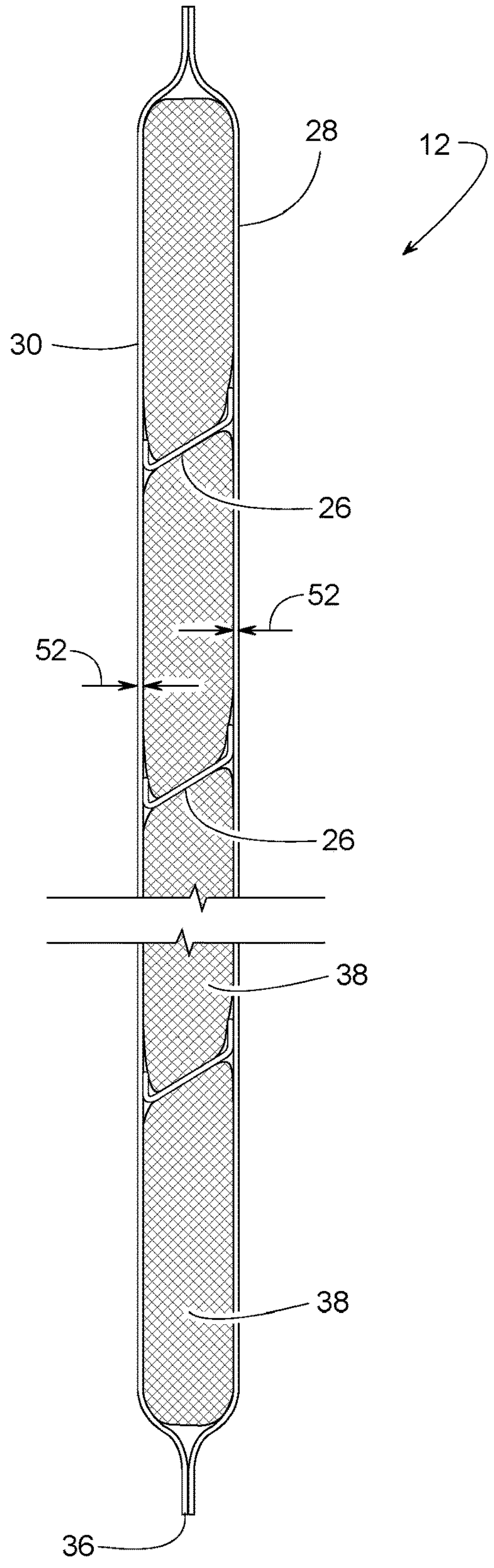
FIG. 8 is a cross-sectional view taken along line 8-8 of FIG. 5.

In some examples, door panel 12 includes a plurality of pliable baffles 26 (FIGS. 5, 8 and 9) that restrict the redistribution of air contained between a first sheet 28 and a second sheet 30 of door panel 12. Sheets 28 and 30 are joined and generally sealed along their outer perimeter to create one large overall air chamber 32 between sheets 28 and 30. Baffles 26 divide chamber 32 into a plurality of more manageable smaller chambers 34. For illustrative clarity, baffles 26 and chambers 32 and 34 are shown in FIG. 5 to extend slightly less than a full width 40 of door panel 12, however, baffles 26 and chambers 32 and 34 preferably extend the full width of door panel 12. As door 10 opens and creates a horizontal crease in sheets 28 and 30 (e.g., where door panel 12 bends over mandrel 16), baffles 26 help prevent air trapped within chamber 32 from over inflating the lower end of door panel 12. Thus, baffles 26 prevent the area between mandrel 16 and a lower leading edge 36 of door panel 12 from bulging excessively as door 10 opens.

In some examples, baffles 26 are sufficiently flexible to accommodate some relative translation between sheets 28 and 30 as door panel 12 bends over mandrel 16. The flexibility of baffles 26 may also enable door panel 12 to restorably break away if something were to accidentally collide with the door 10. Additionally or alternatively, some examples of baffles 26 are sufficiently flexible to conformingly mate with the lateral edges or vertical seams 33 of sheets 28 and 30 so that there is minimal leakage or air exchange between chambers 34. Further, in some examples, baffles 26 are sufficiently stiff to maintain a desired spacing between sheets 28 and 30, particularly in examples where insulation is not used for maintaining such spacing. Further yet, in some examples, baffles 26 have a thermal resistance (i.e., R-value) that is equal to or greater than that of sheets 28 and 30.

Although the actual construction of door panel 12 may vary, the illustrated examples have sheets 28 and 30 being made of any suitable polymeric or natural fabric material that is preferably pliable and can be joined along their outer perimeter by adhesion, tape, melting/fusing/welding, sewing, hook-and-loop fastener, snaps, rivets, zipper, etc. The term, "polymeric," as used in this patent to describe a material means that the material includes at least some plastic or polymer base, substrate or coating. The term, "pliable" as used in this patent to describe a sheet of material means the sheet is sufficiently flexible to be folded over onto itself and subsequently unfolded without appreciable permanent damage. For toughness, wear resistance, heat seal weldability and flexibility, some examples of sheets 28 and 30 comprises polyurethane sheet material between about 1 and 2 mm thick (thickness 52). In some examples, substantially the entire outer perimeter, including seams 33 and the upper and lower edges of door panel 12, is sealed to prevent appreciable amounts of air from flowing in and out of chamber 32 Inhibiting moist air from repeatedly entering chamber 32 can prevent mold-promoting water vapor from condensing inside chamber 32 on a panel sheet that is facing, for example, a cold storage room.

Baffles 26 can be made of a material similar to or different than that of sheets 28 and 30. The flexibility of sheets 28 and 30 enables door panel 12 to bend over mandrel 16, while the flexibility of baffles 26 enables limited relative translation between sheets 28 and 30 as door 10 opens and closes. As door 10 opens or closes and door panel 12 travels and bends across mandrel 16, this action urges relative vertical translation between sheets 28 and 30. In some examples, thermally insulating pads 38 (e.g., resiliently compressible foam pads, polyester batting, etc.) are installed within chambers 34. The term, "thermally insulating," as used in this patent to describe pads 38 within door panel 12 means that the pads provide the greatest contribution of the door panel's overall thermal resistance or R-value.

For the illustrated examples, baffles 26 are horizontally elongate, which enable the baffles 26 to not only restrict vertical airflow within door panel 12 but also to accommodate relative vertical translation between sheets 28 and 30. In other examples, door panel 12 is provided with vertically elongate baffles or a combination of vertical and horizontal baffles.

To effectively restrict airflow within door panel 12, horizontally elongate baffles 26 preferably extend along at least most of the full width 40 of door panel 12. To facilitate manufacturing, however, baffles 26 can be made slightly shorter than the panel's full width 40 to make it easier to join the lateral vertical edges of sheets 28 and 30 together. Baffles 26 being a little shorter than full width 40 of door panel 12 places the plurality of air chambers 34 in fluid communication with each other. Thus, as door 10 opens and door panel 12 travels across mandrel 16, some air within door panel 12 will be temporarily redistributed to at least one of the lower chambers (e.g., air chamber 34') of the plurality of chambers 34, thereby slightly increasing the air pressure within chamber 34' temporarily, but not really detrimentally.

Figure 9:
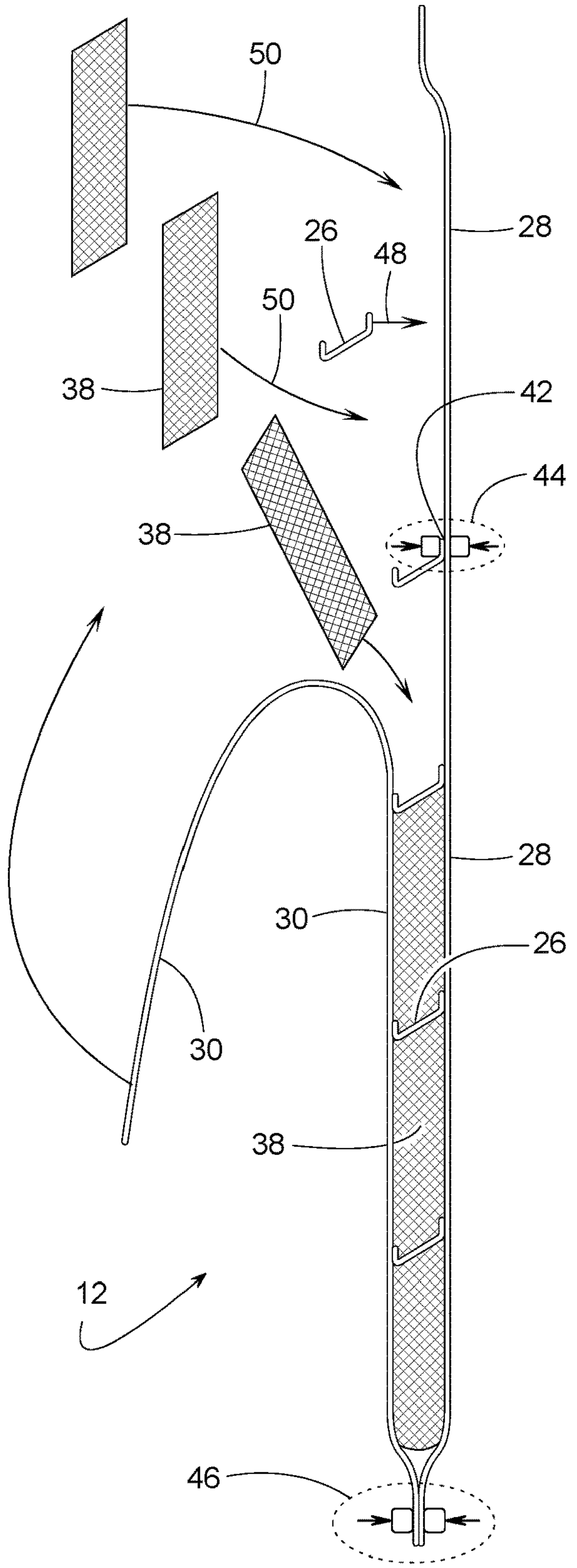
FIG. 9 is a cross-sectional view similar to FIG. 8 but showing the example door panel being assembled.

Although the general assembly of door panel 12 can be accomplished by various means, FIG. 9 illustrates one example manufacturing method. One horizontal edge of each baffle 26 is melted or ultrasonically welded to first sheet 28, thereby creating a plurality of fused joints 42 between sheet 28 and each of baffles 26. Fusing baffles 26 to at least one of sheets 28 and 30 is schematically depicted by the block at reference number 44 of FIG. 9. Alternate methods of attaching baffles 26 in place include, but are not limited to, bonding, taping, sewing, fastening via hook-and-loop fastener, riveting, etc.

An outer perimeter of sheet 28 is fused, sewn or otherwise connected to sheet 30 as schematically depicted by the block at reference number 46 of FIG. 9. The plurality of baffles 26 are installed between sheets 28 and 30, as schematically depicted by arrow 48 and insulation pad 38 is installed within chambers 34, as schematically depicted by arrows 50. The example method represented by the block at reference number 44 and arrows 48 and 50 may be done generally together in a progressive sequence from one end of door panel 12 to another or in any other suitable order. FIG. 9, for example, shows door panel 12 being assembled progressively from the bottom up.

Sheets 28 and 30, when made of polyurethane, have significant resistance to water vapor transmission therethrough. Nonetheless, some water vapor might still permeate the warmer of sheets 28 and 30 and migrate through pads 38 toward the colder sheet 28 or 30. If sheet 30, for example, is warmer than sheet 28, water vapor might permeate door panel 12 through sheet 30 and condense and perhaps freeze on the inner surface of sheet 28. An accumulation of trapped liquid water or ice within chamber 34 may inhibit normal operating characteristics of the door panel 12.

Figure 10:
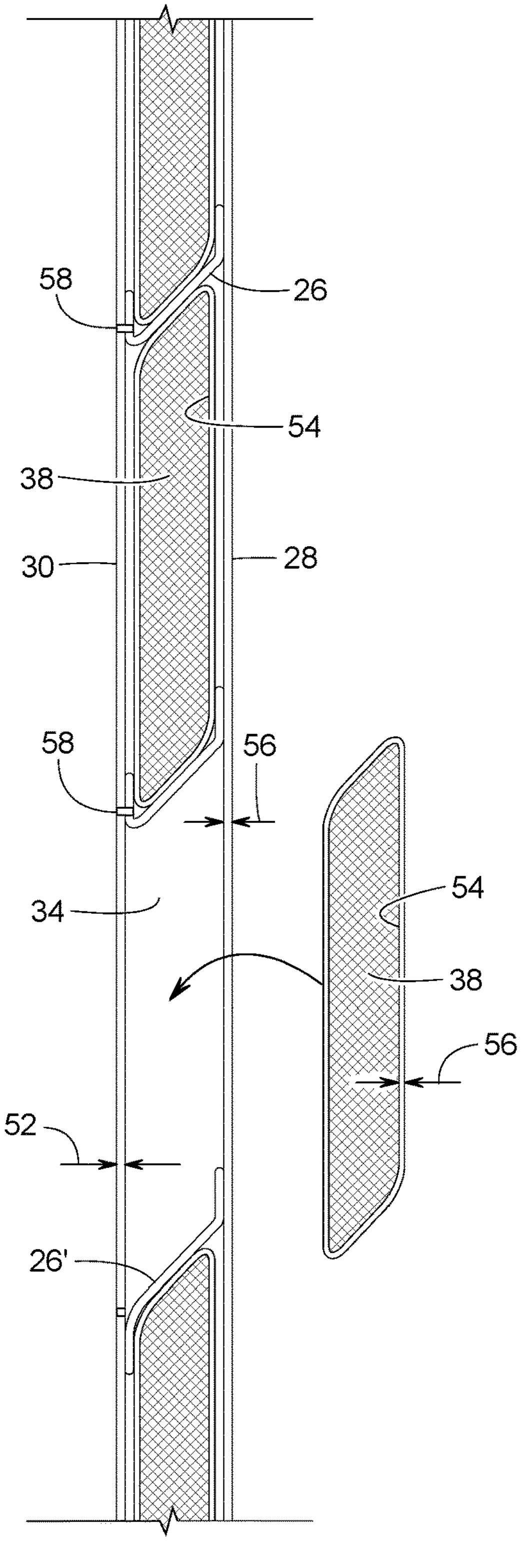
FIG. 10 is a cross-sectional view similar to FIG. 8 but showing another example assembly and with one pad removed.

To address this potential problem, thermally insulating pads 38, as shown in the example of FIG. 10, is substantially encircled and/or surrounded and preferably encased by a sheet 54 (third sheet) that has a lower water vapor transmission rate than that of polyurethane. In some examples, sheet 54 starts as a tube in which pad 38 is inserted. After pad insertion, the axial ends of the sheet's tubular form are, in some examples, heat sealed to totally encase pad 38 within sheet 54, somewhat analogous to a bed pillow in a pillow case. Examples of sheet 54 include, but are not limited to, polyester, polyethylene and aluminum foil. In some examples, sheet 54 is between about 0.1 and 0.2 mm thick (thickness 56) with an R-value that is less than that of sheets 28 and 30. Sheet 54 being much thinner than sheets 28 and 30 maximizes the insulating pad's thickness and thus the pad's R-value for a given door panel thickness. Having sheet 54 be relatively thin is a viable option because sheet 54 is protected by the tough outer sheets 28 and 30. While the above example describes the sheet 54 surrounding the pad 38, in other examples, the sheet or sheets 54 may be positioned adjacent one or more surfaces and/or faces of the pad 38. For example, the sheet 54 may be positioned adjacent a face of the pad 38 between pad 38 and the sheet 30 (e.g., the sheet to be adjacent a warmer side of the building) while not being adjacent the other faces of the pad 38. In other examples, the sheets 54 may be positioned adjacent opposing surfaces of the pad 38, one of which being positioned between the sheet 30 and the pad 38 and the other of which being positioned between the sheet 28 and the pad 38.

In addition or alternatively, in some examples, baffles 26 lean downward toward the warmer sheet, e.g., toward sheet 30. In the illustrated example, the baffles 26 are at a non-perpendicular angle relative to a longitudinal axis of the panel 12 such that ends of the baffles 26 are longitudinally displaced along the longitudinal axis of the panel 12. This allows baffles 26 to drain any accumulated liquid water within chamber 34 down through optional condensate drain holes 58 in sheet 30. Baffle 26 being inclined also allows adjacent pads 38 to overlap at the pads' upper and lower edges, thereby ensuring vertically overlapping insulation at baffles 26. A baffle 26' is an alternate example configuration of baffle 26.

Figure 11:
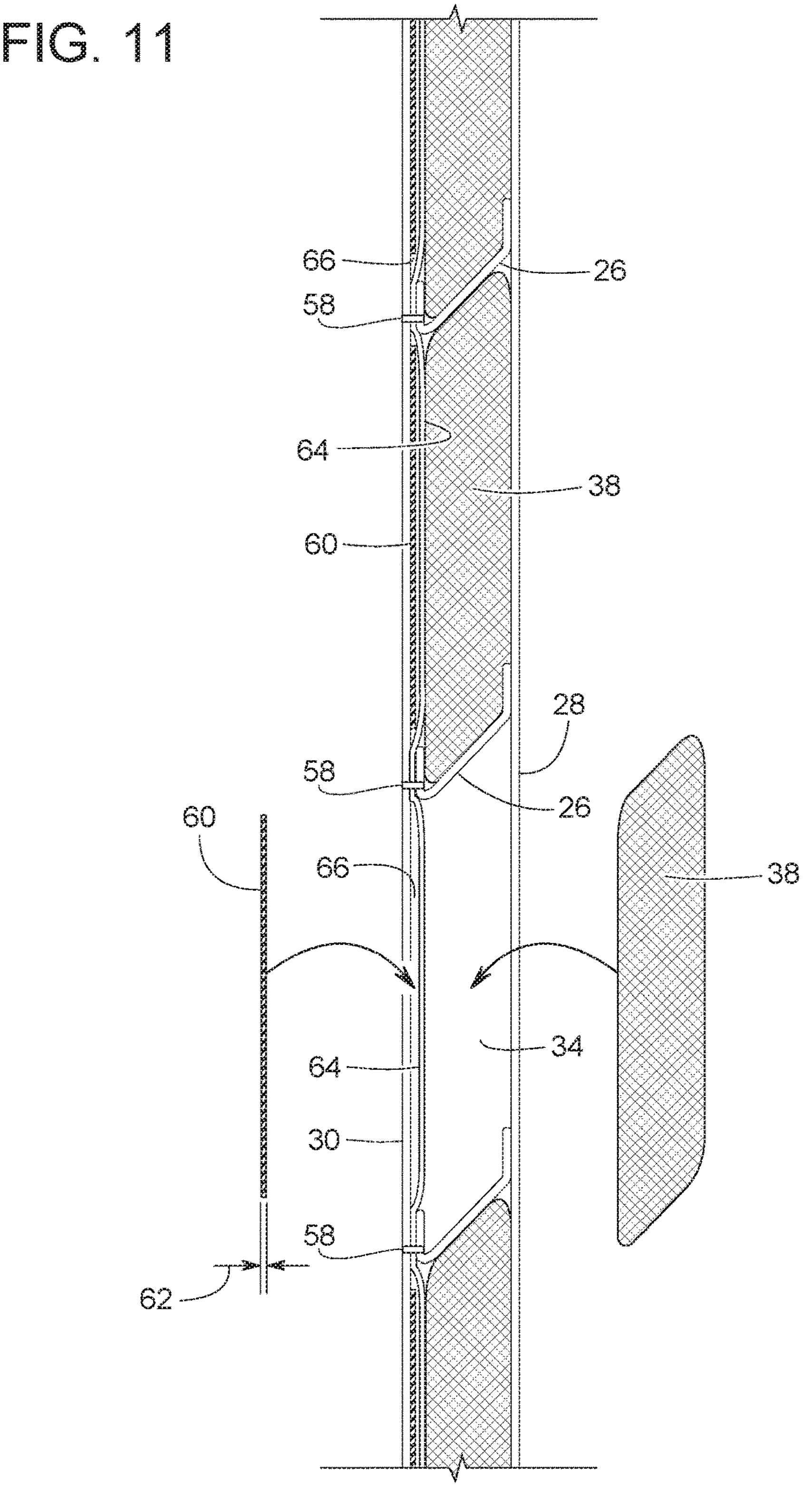
FIG. 11 is a cross-sectional view similar to FIG. 10 but showing another example assembly.

In addition or alternatively, as shown in FIG. 11, a sheet 60 (another example third sheet) having a lower water vapor transmission rate than that of polyurethane is installed between pad 38 and sheet 30 to block water vapor on the exterior side of sheet 30 from penetrating chamber 34. Examples of sheet 60 include, but are not limited to, polyester, polyethylene and aluminum foil. In some examples, sheet 60 is about 0.5 mm thick (thickness 62) with an R-value that is less than that of sheets 28 and 30. The lower R-value of sheet 60, in some examples, is due to sheet 60 being thinner than sheets 28 and 30.

To help hold multiple sheets 60 in place, in some examples, a continuous or segmented sheet 64 (fourth sheet) is thermally or otherwise joined to sheet 30 and/or baffles 26 to create a plurality of pockets 66 in which sheets 60 are inserted. To facilitate effective thermal bonding of sheet 64 with sheet 30 and/or baffle 26, in some examples, baffles 26 and sheets 28, 30, and 64 each comprise polyurethane.

An example flexible door panel movable between an open position and a closed position relative to a doorway includes a first pliable sheet made of a first polymeric material. The first sheet has a first water vapor transmission rate. The example flexible door panel also includes a second pliable sheet made of a second polymeric material. The second sheet is generally parallel to the first sheet when the door is in the closed position. The second sheet has a second water vapor transmission rate. The example flexible door panel also includes a thermally insulating pad between the first sheet and the second sheet. The thermally insulating pad is resiliently compressible. The example flexible door panel also includes a third sheet between the first sheet and the thermally insulating pad. The third sheet has a third water vapor transmission rate. The third water vapor transmission rate is lower than the first water vapor transmission rate, and the third water vapor transmission rate is lower than the second water vapor transmission rate.

In some examples, the first sheet has a first R-value, the second sheet has a second R-value, and the third sheet has a third R-value. The first R-value is greater than the third R-value, and the second R-value is greater than the third R-value. In some examples, the first sheet has a first thickness, the second sheet has a second thickness, the third sheet has a third thickness. The first thickness is greater than the third thickness, and the second thickness is greater than the third thickness. In some examples, at least one of the first sheet or the second sheet includes polyurethane. In some examples, at least one of the first sheet or the second sheet defines a condensate drain hole.

In some examples, the example flexible door panel also includes a plurality of baffles connecting the first sheet to the second sheet to define a plurality of chambers between the first sheet and the second sheet. The plurality of baffles is connected to the first sheet and the second sheet at a plurality of fused joints. In some examples, the example flexible door panel also includes a plurality of thermally insulating pads disposed within the plurality of chambers. The plurality of thermally insulating pads includes the thermally insulating pad. In some examples, the third sheet encircles the thermally insulating pad. In some examples, the example flexible door panel also includes a fourth pliable sheet made of a fourth polymeric material. The fourth sheet has a fourth water vapor transmission rate that is greater than the third water vapor transmission rate of the third sheet. The fourth sheet is joined to at least one of the first sheet or the plurality of baffles to define a pocket between the fourth sheet and the first sheet. The third sheet is disposed within the pocket. The fourth sheet is interposed between the third sheet and the thermally insulating pad. In some examples, the first sheet is to be colder than the second sheet when the door is installed in the doorway of a cold storage room.

In some examples, a flexible door panel movable between an open position and a closed position relative to a doorway includes a first pliable sheet made of a first polymeric material and a second pliable sheet made of a second polymeric material. The second sheet is generally parallel to the first sheet when the door is in the closed position. The flexible door panel also includes a plurality of baffles connecting the first sheet to the second sheet to define a plurality of chambers between the first sheet and the second sheet. The plurality of baffles is connected to the first sheet and the second sheet. The flexible door panel also includes a plurality of thermally insulating pads disposed within the plurality of chambers. A thermally insulating pad of the plurality of thermally insulating pads is between the first sheet and the second sheet. The thermally insulating pad is resiliently compressible. The flexible door panel also includes a third sheet encircling the thermally insulating pad.

In some examples, the first sheet has a first R-value, the second sheet has a second R-value, the third sheet has a third R-value. The first R-value is greater than the third R-value, and the second R-value is greater than the third R-value. In some examples, the first sheet has a first thickness, the second sheet has a second thickness, the third sheet has a third thickness. The first thickness is greater than the third thickness, and the second thickness is greater than the third thickness. In some examples, at least one of the first sheet or the second sheet includes polyurethane. In some examples, at least one of the first sheet or the second sheet defines a condensate drain hole. In some examples, the third sheet has a third water vapor transmission rate. The third water vapor transmission rate is lower than the first water vapor transmission rate, and the third water vapor transmission rate is lower than the second water vapor transmission rate.

An example flexible door panel movable between an open position and a closed position relative to a doorway includes a first pliable sheet made of a first polymeric material. The first sheet has a first water vapor transmission rate. The flexible door panel also includes a second pliable sheet made of a second polymeric material. The second sheet is generally parallel to the first sheet when the door is in the closed position. The second sheet has a second water vapor transmission rate. The flexible door panel also includes a plurality of baffles connecting the first sheet to the second sheet to define a plurality of chambers between the first sheet and the second sheet. The plurality of baffles is connected to the first sheet and the second sheet. The flexible door panel also includes a plurality of thermally insulating pads disposed within the plurality of chambers. A thermally insulating pad of the plurality of thermally insulating pads is between the first sheet and the second sheet. The thermally insulating pad is resiliently compressible. The flexible door panel also includes a third sheet between the first sheet and the thermally insulating pad. The third sheet has a third water vapor transmission rate. The flexible door panel also includes a fourth pliable sheet made of a fourth polymeric material. The fourth sheet is joined to at least one of the first sheet or at least one of the plurality of baffles to define a pocket between the fourth sheet and the first sheet. The third sheet is disposed within the pocket. The fourth sheet is interposed between the third sheet and the thermally insulating pad. The third water vapor transmission rate is lower than the first water vapor transmission rate, and the third water vapor transmission rate is lower than the second water vapor transmission rate.

In some examples, the first sheet has a first R-value, the second sheet has a second R-value, the third sheet has a third R-value, the first R-value is greater than the third R-value, and the second R-value is greater than the third R-value. In some examples, the first sheet has a first thickness, the second sheet has a second thickness, the third sheet has a third thickness. The first thickness is greater than the third thickness, and the second thickness is greater than the third thickness. In some examples, at least one of the first sheet or the second sheet includes polyurethane. In some examples, at least one of the first sheet or the second sheet defines a condensate drain hole. In some examples, the first sheet is to be colder than the second sheet when the door is installed in the doorway of a cold storage room.

An example door includes a first sheet coupled to a second sheet to define a chamber therebetween. The door also includes a thermally insulating pad within the chamber and a third sheet adjacent the thermally insulating pad to substantially prevent water vapor from permeating the thermally insulating pad. The third sheet is positioned between the thermally insulating pad and at least one of first sheet or the second sheet. In some examples, the third sheet substantially surrounds the thermally insulating pad. The door may also include a baffle and a drain hole. The baffle is coupled to the first and second sheets at a non-perpendicular angle relative to a longitudinal axis of the door when the door is in a closed position. The drain hole is defined by one of the first sheet or the second sheet adjacent the baffle to enable liquid to flow within the chamber along at least one of the baffle, the first sheet, or the second sheet through the drain hole.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

What is claimed is:

1. A door comprising:
- a first track;
- a second track, and
- flexible door panel to extend between the first and second tracks, the flexible door panel to bend due to movement of the flexible door panel along a non-linear travel path between an open position and a closed position relative to a doorway, the flexible door panel including:
  - a first pliable sheet made of a first polymeric material, the first sheet having a first water vapor transmission rate;
  - a second pliable sheet made of a second polymeric material, the second sheet being generally parallel to the first sheet when the door panel is in the closed position, the second sheet having a second water vapor transmission rate;
  - a thermally insulating pad between the first sheet and the second sheet, the thermally insulating pad being resiliently compressible;
  - a third pliable sheet made of a third polymeric material having a third water vapor transmission rate; and
  - a fourth pliable sheet having a fourth water vapor transmission rate,
  - wherein the first and third sheets define a pocket therebetween to hold the fourth pliable sheet having the fourth water vapor transmission rate, the fourth water vapor transmission rate being lower than the first water vapor transmission rate, the fourth water vapor transmission rate being lower than the second water vapor transmission rate, the third water vapor transmission rate being greater than the fourth water vapor transmission rate of the fourth sheet, and the third sheet being interposed between the fourth sheet and the thermally insulating pad.

2. The door of claim 1, wherein the flexible door panel includes the fourth pliable sheet, wherein the first sheet has a first R-value, the second sheet has a second R-value, the fourth sheet has a fourth R-value, the first R-value is greater than the fourth R-value, and the second R-value is greater than the fourth R-value.

3. The door of claim 1, wherein the first sheet has a first thickness, the second sheet has a second thickness, the fourth sheet has a fourth thickness, the first thickness is greater than the fourth thickness, and the second thickness is greater than the fourth thickness.

4. The door of claim 1, wherein at least one of the first sheet or the second sheet includes polyurethane.

5. The door of claim 1, wherein at least one of the first sheet or the second sheet defines a condensate drain hole.

6. The door of claim 1, wherein the thermally insulating pad is a first thermally insulating pad, the flexible door panel further including:
- a plurality of baffles connecting the first sheet to the second sheet to define a plurality of chambers between the first sheet and the second sheet, the plurality of baffles being connected to the first sheet and the second sheet at a plurality of fused joints; and
- a plurality of thermally insulating pads disposed within the plurality of chambers, the plurality of thermally insulating pads includes the first thermally insulating pad.

7. The door of claim 6, wherein the third sheet is disposed between the plurality of baffles and the first sheet at corresponding ones of the plurality of fused joints.

8. The door of claim 6, wherein the third sheet is joined to at least one of the first sheet or the plurality of baffles to define the pocket between the third sheet and the first sheet.

9. The door of claim 1, wherein the first sheet is to be colder than the second sheet when the door panel is installed in the doorway of a cold storage room, the first sheet to face the cold storage room and the second sheet to face a different area, the cold storage room to be at a temperature that is lower than the different area.

10. A flexible door panel movable between an open position and a closed position relative to a doorway, the door panel comprising:
- a first pliable sheet made of a first polymeric material;
- a second pliable sheet made of a second polymeric material, the second sheet coupled to the first sheet at a perimeter of the first and second sheets, the second sheet being generally parallel to the first sheet when the door panel is in the closed position;

a plurality of baffles extending longitudinally across a width of the first sheet and a width of the second sheet, the plurality of baffles including first longitudinal edges coupled to the first sheet and second longitudinal edges coupled to the second sheet to define a plurality of chambers between the first sheet and the second sheet, the first longitudinal edges being closer to the first sheet than the second longitudinal edges are to the first sheet when the door panel is in the closed position;

a plurality of thermally insulating pads disposed within the plurality of chambers, a first thermally insulating pad of the plurality of thermally insulating pads being between the first sheet and the second sheet, the first thermally insulating pad being resiliently compressible;

a third sheet between the first sheet and the first thermally insulating pad; and a fourth pliable sheet made of a fourth polymeric material, the fourth sheet being joined to at least one of the first sheet or at least one of the plurality of baffles to define a pocket between the fourth sheet and the first sheet, the third sheet being disposed within the pocket, the fourth sheet being interposed between the third sheet and the first thermally insulating pad;

wherein the first sheet has a first water vapor transmission rate, the second sheet has a second water vapor transmission rate, and the third sheet has a third water vapor transmission rate, the third water vapor transmission rate being lower than the first water vapor transmission rate, and the third water vapor transmission rate being lower than the second water vapor transmission rate.

11. The flexible door panel of claim 10, wherein the first sheet has a first R-value, the second sheet has a second R-value, the third sheet has a third R-value, the first R-value is greater than the third R-value, and the second R-value is greater than the third R-value.

12. The flexible door panel of claim 10, wherein at least one of the first sheet or the second sheet includes polyurethane.

13. The flexible door panel of claim 10, wherein at least one of the first sheet or the second sheet defines a condensate drain hole.

14. A door, comprising:

a first sheet to span a width and a height of a doorway;

a second sheet to span the width and the height of the doorway, the second sheet coupled to the first sheet;

a thermally insulating pad disposed between the first and second sheets;

a third sheet adjacent the thermally insulating pad to substantially prevent water vapor from permeating the thermally insulating pad, the third sheet being positioned between the thermally insulating pad and the first sheet; and a fourth sheet affixed to the first sheet along a first elongate region and along a separate second elongate region spaced apart from the first elongate region, the first and second elongate regions to extend in a direction across the width of the doorway when the door is in a closed position, the first sheet and the fourth sheet defining a pocket between the first and second elongate regions, the third sheet being held in place within the pocket;

wherein the first sheet has a first water vapor transmission rate, the second sheet has a second water vapor transmission rate, and the third sheet has a third water vapor transmission rate, the third water vapor transmission rate being lower than the first water vapor transmission rate, and the third water vapor transmission rate being lower than the second water vapor transmission rate.

15. The door of claim 14, wherein the third sheet is free to translate relative to the first and fourth sheets.

16. The door of claim 14, wherein the thermally insulating pad is a first thermally insulating pad, the door further including:

a plurality of baffles extending between the first and second sheets to define a plurality of chambers; and a plurality of thermally insulating pads disposed within the plurality of chambers, the plurality of thermally insulating pads including the first thermally insulating pad.

17. The door of claim 16, wherein the fourth sheet is segmented between different ones of the plurality of chambers.

18. The door of claim 16, wherein the fourth sheet is continuous across multiple ones of the plurality of chambers.

19. The door of claim 14, further including a baffle and a drain hole, the baffle coupled to the first and second sheets at a non-perpendicular angle relative to a longitudinal axis of the door when the door is in the closed position, the drain hole defined by one of the first sheet or the second sheet adjacent the baffle to enable liquid to flow between the first and second sheets along at least one of the baffle, the first sheet, or the second sheet through the drain hole.

* * * * *